Figure 1:
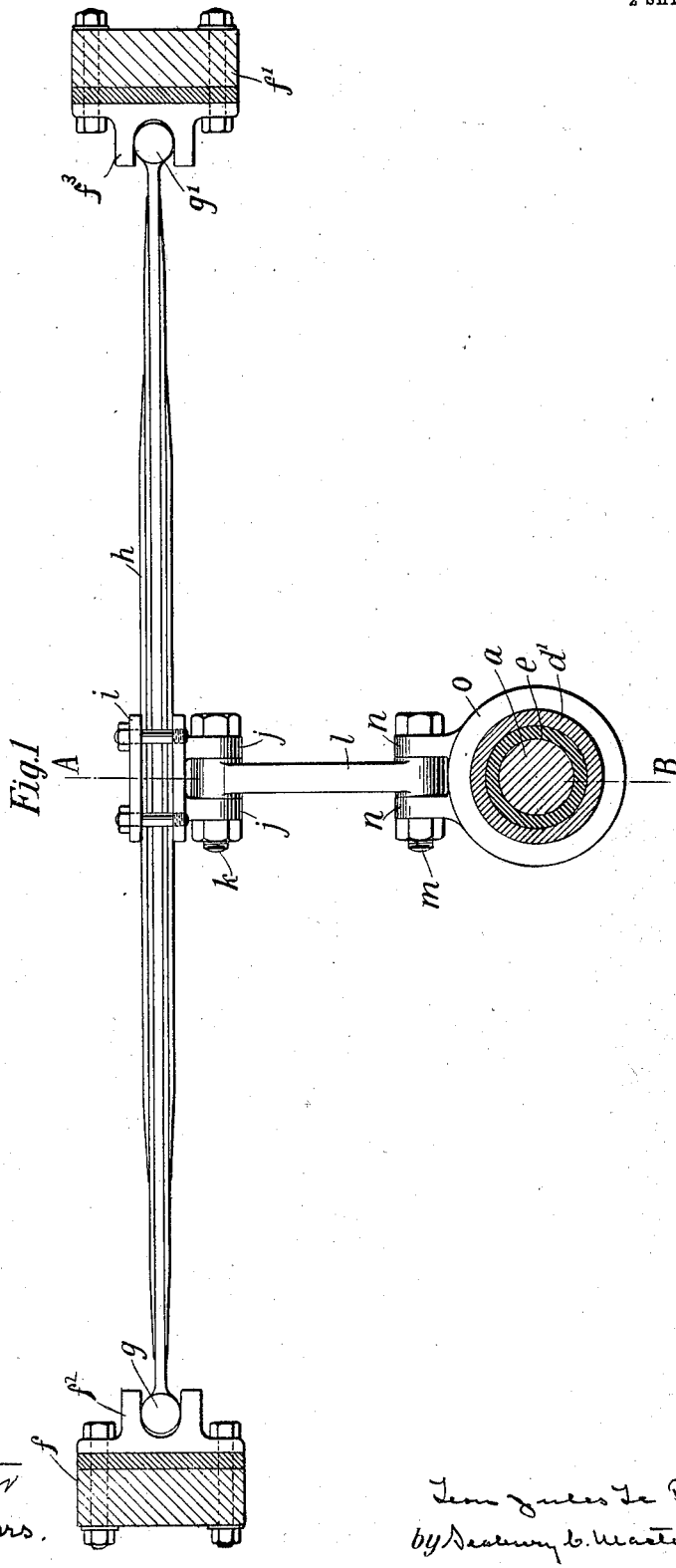

No. 731,473. PATENTED JUNE 23, 1903.
L. J. LE PONTOIS.
MEANS FOR SUPPORTING POWER TRANSMITTING MECHANISM.
APPLICATION FILED NOV. 28, 1902.
NO MODEL. 2 SHEETS—SHEET 1.

Witnesses:
Raphall Ritter
Otto P. Osmers

Inventor
Léon Jules Le Pontois
by Seabury C. Mastick, his Atty

No. 731,473. PATENTED JUNE 23, 1903.
L. J. LE PONTOIS.
MEANS FOR SUPPORTING POWER TRANSMITTING MECHANISM.
APPLICATION FILED NOV. 28, 1902.
NO MODEL. 2 SHEETS—SHEET 2.

Witnesses:
Raphaël Netter
Otto P. Osmers

Inventor
Leon Jules Le Pontois
by [signature] his Att'y

No. 731,473.

Patented June 23, 1903.

UNITED STATES PATENT OFFICE.

LEON JULES LE PONTOIS, OF NEW YORK, N. Y.

MEANS FOR SUPPORTING POWER-TRANSMITTING MECHANISM.

SPECIFICATION forming part of Letters Patent No. 731,473, dated June 23, 1903.

Application filed November 28, 1902. Serial No. 133,035. (No model.)

*To all whom it may concern:*

Be it known that I, LEON JULES LE PONTOIS, a citizen of the Republic of France, and a resident of New York city, State of New York, have invented certain new and useful Improvements in Means for Supporting Power-Transmitting Mechanism, of which the following is a specification.

My invention relates to an improvement in means for supporting power-transmitting mechanism, and is capable of general application to any form of power-transmitting mechanism which is subjected to shock or strain.

The object of my invention is to relieve the gear and, in the case of a self-propelled vehicle operated through said gear, the wheels from the shock or strain imposed upon them by irregular impulses of the motor and to relieve the gear and the motor from the shock or strain due to the irregularities of the road over which the wheels pass.

The invention consists in the combination of a transverse spring or a spring mounted transversely of the power-transmitting shaft, resting at its ends in fixed bolsters with a link pivotally suspended at both ends between said spring and shaft, whereby the spring is permitted to take up the strain referred to.

For the purpose of illustrating my invention in one of its forms I shall describe the same in connection with a driving mechanism of a self-propelled vehicle.

In a self-propelled vehicle employing steam, gasolene, or other motive agent in which the driving-shaft is directly connected to a gear-wheel on the driven shaft or forming a part of the compensating gear on the axle of one of the pairs of wheels of the vehicle the shocks and strains to which said gears and wheels are subjected are communicated to said shaft and the body of the vehicle, causing discomfort to the occupants of the vehicle and injuriously affecting the driving mechanism. Irregular movements of the motor likewise cause a reverse effect upon the gear and wheels. By the present invention I provide a novel means for suspending the driving-shaft, so as to take up all shock and to cause an equalization and even distribution of the strains, relieving the body of the vehicle as well as the driving mechanism from all injurious jarring.

Figure 2:
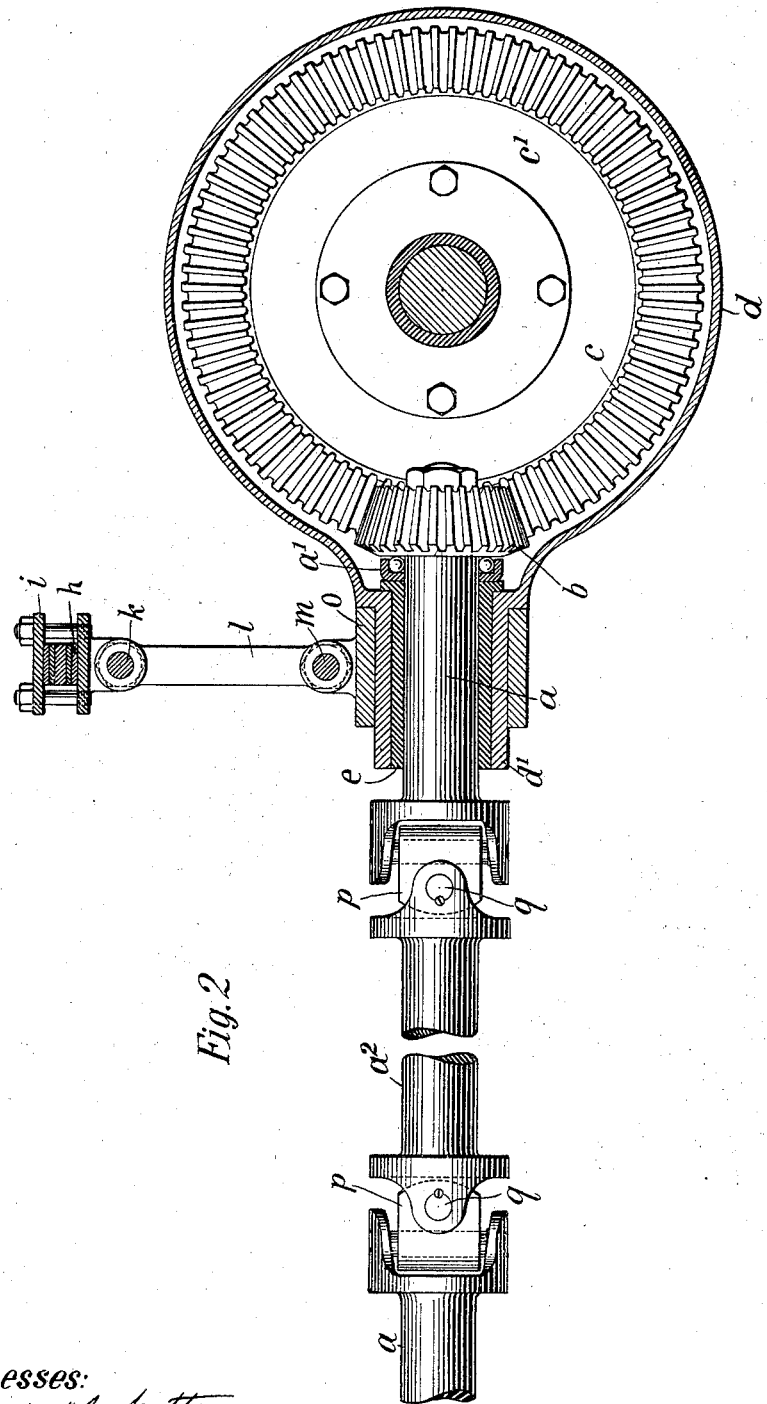

In the drawings, Figure 1 is a view in elevation of the suspension means, certain other parts being shown in section; and Fig. 2 is a view on the plane of line A B of Fig. 1.

Similar letters of reference indicate similar parts throughout both views.

Referring to the drawings, $a$ designates the driving-shaft, receiving a rotary motion from any suitable source of power or connected to a motor in any suitable manner. In the particular example of my invention here illustrated a pinion $b$ is keyed or otherwise secured to the shaft $a$, said pinion engaging a bevel-gear $c$, forming a part of the compensating gear $c'$ of the vehicle, so that the motion of the shaft is imparted to the axle, in this instance driving the wheels of the vehicle.

$d$ designates a casing inclosing the driving-gear, the casing having an outwardly-extended annular portion $d'$ surrounding a portion of the shaft $a$, a bushing $e$ being interposed between the shaft and the said annular portion. The casing therefore provides a bearing for one end of the shaft, and, if preferred, a suitable thrust-ball bearing may be provided between the pinion $b$ and bushing $e$, the balls being retained in a cup $a'$, as shown in Fig. 2.

$f$ and $f'$ designate side supporting-frames—as, for instance, the side frames of a vehicle. To these frames are secured by bolts bolsters $f^2$ and $f^3$, respectively, for the reception of the ends $g$ and $g'$ of a laminated or leaf spring $h$. A yoke $i$, embracing the spring $h$, is provided with projecting lugs $j$, which lugs support a pin $k$. Pivotally suspended from said pin $k$ is a link $l$, having its lower end pivotally supported on a pin $m$, carried by lugs $n$ of a collar $o$, which collar embraces the annular portion $d'$ of the casing $d$. The link $l$ is free to rock on both of its supporting-pins, and such link constitutes a rocking or yielding member, which, in connection with the spring $h$, relieves the gearing and motor as well as the vehicle from the effect of sudden and disagreeable jolts. The ends of the spring are preferably rounded or cylindrical, and the bolsters are provided with corresponding seats adapted to permit slight endwise movement of the spring in the direction of its length and allowing the spring to coact with the link.

In the drawings I have shown a divided driving-shaft, the portion $a^2$ being constituted of a section secured at its ends to the main section $a$ by means of knuckle-joints $p$ of any approved construction. As the section $a^2$ is free to turn about the pivot-pins $q\ q$ of the knuckle-joints, any injurious effect due to possible lack of alinement of the shaft with the driven gear and which might result from movement of the springs or carriage-body is obviated.

I am aware that many changes may be made in details of construction without departing from the spirit of my invention, and I do not restrict myself to the details or the specific construction shown.

What I claim, and desire to secure by Letters Patent of the United States, is—

1. In combination with power-transmitting mechanism, a spring, supports for said spring and a rocking member interposed between said spring and said mechanism.

2. In combination with power-transmitting mechanism, a spring, supports for said spring, and a link pivotally connected at one end to said spring and at the other end to said mechanism.

3. In combination with power-transmitting mechanism, a driving-shaft, a spring supported by its ends transversely to said shaft, and a link pivotally connected at one end to said spring and at the other end to said shaft.

4. In combination with power-transmitting mechanism comprising a shaft and suitable gearing, a casing inclosing said gearing and bearing upon said shaft, a spring supported transversely to said shaft and a pivoted link interposed between said spring and said casing.

In witness whereof I have hereunto signed my name in the presence of two subscribing witnesses.

LEON JULES LE PONTOIS.

Witnesses:
SEABURY C. MASTICK,
OTTO P. OSMERS.